3,493,634
POLYURETHANES FOR INJECTION MOLDING CONTAINING POLYETHER, POLYESTER AND GLYCOL
Edmond G. Kolycheck, Lorain, Ohio, assignor to The B. F. Goodrich Company, New York, N.Y., a corporation of New York
No Drawing. Filed May 23, 1966, Ser. No. 551,952
Int. Cl. C08g 41/04, 22/00, 17/00
U.S. Cl. 260—858      5 Claims

ABSTRACT OF THE DISCLOSURE

Polyurethanes especially adapted for injection molding are prepared by reacting a mixture of 60 to 85 parts of a hydroxyl terminated polyester having a molecular weight between 900 and 3000 about 15 to 40 parts of a hydroxyl poly(alkylene oxide) having a molecular weight from about 800 and 2000 and from about 1.25 to 12.8 mols of an aliphatic glycol per mol total of polyester and poly(alkylene oxide), said mixture having an average molecular weight of about 350 to about 450, with a diphenyl diisocyanate in molar amount substantially equal to the total mols of hydroxyl polyester, hydroxyl poly(alkylene oxide) and aliphatic glycol.

---

This invention relates to polyurethanes and relates more particularly to polyurethanes comprising the reaction product of a mixture of a hydroxyl terminated polyester, a hydroxyl poly(alkylene oxide) and a glycol; reacted with an aryl diisocyanate, which are particularly adapted to injection molding.

Polyurethanes disclosed in U.S. Patents 2,289,411 and 2,871,218 are useful polyurethanes having excellent balance of physical properties and which are readily extruded into goods and articles. However, such polyurethanes are not satisfactorily injection molded. Therefore, it is an object of this invention to provide improved polyurethanes of the types set forth in these U.S. patents, which are especially adapted to injection molding.

The elastomeric polyurethanes described in U.S. Patent 2,899,411 are prepared by reacting together a mixture of certain hydroxyl poly(alkylene oxide)s and glycols, with diphenyl diisocyanates. Another class of useful polyurethanes are obtained by reacting together a mixture of certain polyesters mixed with the glycols, with diphenyl diisocyanates are described in U.S. Patent 2,871,218. The polyurethanes prepared in accordance with either of these two patents have high tensile strengths and other desirable physical and chemical properties and do not require vulcanization to develop optimum physical properties. These materials are readily processed in the usual processing equipment, such as calenders and are extruded to form useful articles. However, none of the materials prepared in accordance with these two patents are satisfactory in injection molding operations. In using such materials in injection molding, the following problems are encountered: difficulty in filling mold cavities, sticking in the mold, shrinkage and long cycle times.

I have now found that when a mixture of about 60 to 85 parts of a hydroxyl polyester having a molecular weight between 900 and 3000 is mixed with about 15–40 parts by weight of a hydroxyl poly(alkylene oxide) having a molecular weight between about 800 and 2000 and from about 1.25 to 12.8 mols of an aliphatic glycol per mol of total hydroxyl polyester and poly(alkylene oxide) to provide a mixture having an average molecular weight of about 300 to about 450, and this mixture is thereafter reacted with a diphenyl diisocyanate in a molar amount equal to the total mols of hydroxyl polyester, hydroxyl poly(alkylene oxide) and aliphatic glycol, that polyurethane is obtained having a good balance of valuable physical properties, and quite unexpectedly, is readily molded in commercial injection molding machines without the disadvantages encountered with the polyurethanes described in the above listed U.S. patents.

The novel and improved polyurethanes of this invention are particularly adapted to injection molding and among the advantages of these materials over the prior art polyurethanes are faster molding cycles, improved flow and set-up characteristics, improved mold release characteristics and they may be used to produce molded articles with high fidelity to mold dimensions and shrinkage problems associated with polyurethanes of the above patents are not encountered in injection molding the defined polyurethanes. These polyurethanes can be injection molded in either ram or reciprocating screw machines and no machine modifications are required. These polyurethanes have tensile strengths greater than 4500 p.s.i., Shore "D" hardnesses of 45 to 65, dynamic extrusion temperature $T_2$ values of greater than 160° C. and 300% elastic moduli of about 3000 p.s.i. and higher.

The polyester preferred for use in this invention is an essentially linear hydroxyl terminated polyester having a molecular weight between 900 and 3000 and an acid number less than 10, preferably the polyester has a molecular weight of from about 1000 to 1600 and an acid number less than 5, preferably an acid number less than about 3 in order to obtain a product of optimum physical properties. The molecular weight is determined by assay of the terminal functional groups and is an average molecular weight. The polyester is prepared ordinarily by an esterification reaction of an aliphatic dibasic acid or an anhydride thereof with a glycol. Molar ratios of more than 1 mol of glycol to acid are preferred so as to obtain linear chains containing a preponderance of terminal hydroxyl groups.

The basic polyester utilized include polyesters prepared from the esterification of such dicarboxylic acids as adipic, succinic, pimelic, suberic, azelaic, sebacic and the like or their anhydrides. Preferred acids are those dicarboxylic acids of the formula HOOC—R—COOH, where R is an alkylene radical containing 2 to 8 carbon atoms. More preferred are those represented by the formula

$$\text{HOOC(CH}_2)_x\text{COOH}$$

where $x$ is a number from 2 to 10. Adipic acid is preferred. The glycols utilized in the preparation of the polyester by reaction with the aliphatic dicarboxylic acid are preferably straight chain glycols containing between 4 and 10 carbon atoms such as butanediol-1,4, hexamethylenediol-1,6, octamethylenediol-1,8 and the like. In general the glycol is preferably of the formula $\text{HO(CH}_2)_x\text{OH}$, wherein $x$ may be 2 to 10, but preferably is 4 to 8. Butanediol-1,4 is particularly preferred.

The hydroxyl poly(alkylene oxide)s preferred for use in this invention are essentially linear hydroxyl terminated materials having ether linkages as the major linkage joining carbon atoms, as O, and having a molecular weight between about 800 and 2000. Hydroxyl poly(methylene oxide)s are further preferred, particularly at a molecular weight of from about 900 to about 1100. The hydroxyl poly(methylene oxide)s used in the practice of the invention include hydroxyl poly(trimethylene oxide), hydroxyl poly(tetramethylene oxide), hydroxyl poly(pentamethylene oxide), hydroxyl poly(hexamethylene oxide), and the like, of the formula $\text{HO(CH}_2)_n\text{O}_x\text{H}$ wherein $n$ is a number from 2 to 6 and $x$ is an integer of greater than 7 and of a value equivalent to a compound total molecular weight of about 800 to 2000. Prior to reaction, the hydroxyl poly(methylene oxide)s are preferably extracted with water or treated with cation exchange resins, active earths and the like to provide materials of uniform reactivity with the diphenyl diisocyanates and are dried before use. Mixtures of hydroxyl poly(methylene oxide) may be used. The ratios of reactants are based on one mole of the hydroxyl poly(methylene oxide).

In the practice of the invention an aliphatic glycol in an amount from about 1.25 to 12.8 mols per mol of polyester and hydroxyl poly(methylene oxide) is employed, preferably 2.5 to 5.2. The alkylene glycol must be mixed with the polyester and hydroxyl poly(methylene oxide) prior to reaction of the mixture with the diphenyl diisocyanate. Aliphatic glycols containing 2 to 12 carbon atoms are contemplated for use in this invention. The glycol preferred for this purpose in butanediol-1,4. Other glycols which may be employed include pentanediol, hexanediol, octanediol, dodecanediol and the like which preferably contain the hydroxyl groups in terminal position. A valuable group of glycols are alkylene glycols containing 4 to 6 carbon atoms.

While any aryl diisocyanate may be employed to react with the hydroxyl polyester, hydroxyl poly(methylene oxide) and glycol to form useful products, diphenyl diisocyanates are preferred. For example, diphenyl methane diisocyanate, diphenyl methane-p,p'-diisocyanate, dichlorodiphenyl methane diisocyanate, dimethyl diphenyl methane diisocyanate, diphenyl dimethyl methane diisocyanate, dibenzyl diisocyanate, bitolylene diisocyanate, diphenyl ether diisocyanate and the like of the formula

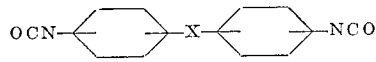

wherein X may be a valence bond, an alkylene radical containing preferably 1 to 5 carbon atoms, NR where R is an alkyl radical, oxygen, sulfur, $SO_2$ and the like; and the isocyanate groups are preferably in a para-position. More preferred are the diphenyl methane diisocyanates and excellent results are obtained from diphenyl methane-p,p'-diisocyanate.

The ratio of reactants employed may be varied from about 2.25 to 13.8 mols of diphenyl diisocyanate per mol of hydroxyl poly(methylene oxide) and polyester with from about 1.25 to 12.8 mols of glycol, the amount of glycol used depending in part upon the molecular weight of the hydroxyl poly(methylene oxide) and polyester employed. The amount of diphenyl diisocyanate used is in turn dependent upon the total amount of glycol, hydroxyl poly(methylene oxide) and polyester and should be a molar amount equivalent to these latter reactants so that there are essentially no free unreacted isocyanate and hydroxyl group remaining in the reaction product. Particularly useful products are obtained with mol ratios of reactants of 1 mol of polyether glycol and hydroxyl polyester, 2.5 to 5.2 mols of aliphatic diol and 3.5 to 6.2 mols of diphenyl diisocyanate.

An essential and critical part of this invention is that the mixture of aliphatic glycol, hydroxyl polyester and hydroxyl poly(methylene oxide) has an average hydroxyl number molecular weight of about 300 to 450, and more preferably from about 325 to about 400. When these values are not observed for the mixture of polyester, glycol and polyether glycol, which is then reacted with the diphenyl diisocyanate, polyurethanes are obtained which do not have the necessary and desired valance of physical properties required for a good injection molding polyurethane material. In other words, when the average molecular weight of the mixture is below about 300 and above about 450 the polyurethanes made therefrom are not suitable for commercial injection molding. To obtain these average molecular weights for the mixture it is necessary that the molecular weights and amount of glycol used be balanced within the quantities set forth hereinabove. In other words, with very high molecular weight polyesters or polyether glycols, very large amounts of glycol are required to obtain the desired average molecular weight of the mixture and, vice-versa when very low molecular weight polyesters or polyether glycols are used very small amounts of glycol would be required to give the desired average molecular weight. Thus, not only must the average molecular weight of the mixture be observed, but it must be obtained by using hydroxyl polyesters and polyalkylene glycols of the types and molecular weights set forth hereinabove, and the glycol used must also be present within the ranges set forth hereinabove.

As is apparent from the above recited ratios of reactants for preparing the unique elastomers of this invention, a product is obtained in which there is essentially no free or unreacted diisocyanate or glycol. An excess of diisocyanate greater than that required to react with the hydroxyl poly(methylene oxide) results in products which have a poor balance of useful physical properties. Of course, a small amount of unreacted isocyanate groups may be tolerated but it is desirable that they are essentially reacted. Likewise, excess free unreacted glycol results in products which are likewise less valuable. An excess of either glycol or diisocyanate of less than about 5 percent above that required for complete utilization of the reactants is desirable. Preferably, the molar amount of hydroxyl poly(methylene oxide) and glycol combined is substantially equivalent to the molar amount of diphenyl diisocyanate employed. More preferred, of course, are equimolar reacting ratios of all reactants.

The reaction employed to prepare the novel products of the invention should be conducted under anhydrous conditions with dry reactants, that is, that the reaction mixture is substantially free of water. It is recognized that a practical matter it is difficult to conduct such a reaction with absolutely dry reactants under completely anhydrous conditions so the requirements of this invention are met when the reaction mixture is essentially free of water. It should be noted that when the reaction is substantially complete it is not necessary to rigidly guard against the introduction of water into the reaction mixture. As a guide, there should be less than about 0.1% water present in the reaction mixture.

The polyurethanes are readily obtained by melting the polyester and adding the polyether glycol and aliphatic diol thereto, while in a molten state adding the aryl diisocyanate and heating, normally at a temperature above 100° C. to complete the reaction.

For example, a mixture of measured amounts of polyester, polyether glycol and aliphatic diol are melted and stirred for about one hour at a pressure of about 5 mm. and a temperature of 100° C. To this mixture is added a measured amount of a diisocyanate as diphenyl methane-p,p'-diisocyanate (MDI), weighed out and charged to within ±0.5% of the stoichiometric equivalency of NCO groups to OH groups, the molar amount of the diisocyanate thereby being substantially equivalent to the molar amount of the polyester polyether glycol and the aliphatic glycol combined. The reaction mixture is stirred for 1 to 5 minutes, and then heated in silicon coated trays for 1 to 2 hours at 140° C. to complete the reaction.

In the following examples the $T_2$ temperature is the melt flow temperature of the elastomer, as distinguished from the $T_1$ temperature which is the softening point or the temperature where the material can be worked. These temperatures were estimated using a dynamic extrusion rheometer. In the operation of this instrument the polymer sample is placed in a chamber equipped with a plunger subjected to a load of 3,263 p.s.i. The sample is gradually heated to effect its ultimate extrusion through a 0.0625 inch diameter orifice. Plunger advance and temperature increase are measured. A plot of these values provides a curve from which $T_1$ and $T_2$ are obtained.

A series of polyurethanes were prepared in accordance with the procedure described above. Hydroxyl polyesters of different molecular weights and varying amounts of aliphatic glycol and hydroxyl poly(alkylene oxide) were used. The proportions and physical properties of the resulting products are set forth in the table below. The hydroxyl polyester was prepared from tetramethylene glycol and adipic acid. The hydroxyl poly(alkylene oxide) was poly(tetramethylene ether) glycol. The aliphatic diol in 1-5 was 1,4-butanediol, and in 6 was ethylene glycol.

|  | 1 | 2 | 3 | 4 | 5 | 6 |
|---|---|---|---|---|---|---|
| (1) Polyester: | | | | | | |
| Molecular weight | 1,016 | 1,016 | 1,550 | 1,550 | 1,550 | 982 |
| Parts | 80 | 80 | 80 | 80 | 75 | 50 |
| (2) Polyether glycol: | | | | | | |
| Molecular weight | 1,000 | 1,000 | 1,000 | 1,000 | 1,000 | 1,000 |
| Parts | 20 | 20 | 20 | 20 | 25 | 50 |
| (3) Glycol mol ratio | 2.0 | 2.5 | 3.2 | 1.2 | 1.6 | 1 |
| Average molecular weight, mixture (1), (2) and (3) | 400 | 347 | 410 | 707 | 592 | 504 |
| Tensile strength, p.s.i. | 8,100 | 7,650 | 7,050 | 7,050 | 8,550 | 5,770 |
| Elongation, percent | 510 | 480 | 580 | 700 | 600 | 500 |
| 300% modulus, p.s.i. | 3,750 | 4,380 | 3,150 | 900 | 1,290 | 2,280 |
| Hardness, Shore D | 48 | 52 | 50 | 33 | 38 | 37 |
| Tear Strength, Graves, lbs./in. | 696 | 844 | 687 | 463 | 594 | 560 |
| Dynamic extrusion temp. $T_2$, °C | 163 | 184 | 177 | 127 | 148 | 138 |

Samples 1, 2 and 3 were readily injection molded in a ram molding device. The resulting molded articles were formed rapidly with short molding cycles, completely filled the mold and were readily released from the molding with no sticking and there was no shrinkage or distortion in the molded articles. In contrast, the polyurethanes of runs 4, 5 and 6 were completely unsatisfactory as injection molding materials in that the molding cycles were longer, it was more difficult to obtain complete mold filling, the molded articles were not removed as readily from the molds, and shrinkage was observed in each case which was particularly bad in the case of 4. It will be noted that the three satisfactory materials prepared in accordance with this invention all had dynamic extrusion temperature $T_2$ values of greater than 160° C. while the three unsatisfactory injection molding materials, runs 4, 5 and 6 had $T_2$ values of less than 150° C.

These polyurethanes which are especially adapted for injection molding may be used to form gears; fan blades and impellers; grease and dust seals; shoe heels; gaskets and O-rings; vibration insulators; motor mounts and the like.

I claim:
1. A polyurethane adapted for injection molding comprising the reaction product of a mixture of, about 60 to 85 parts of a hydroxy terminated polyester having a molecular weight between 900 and 3000, about 15 to 40 parts of a hydroxyl poly(alkylene oxide) having a molecular weight between about 800 and 2000 and from about 1.25 to 12.8 mols of an aliphatic glycol containing 2 to 12 carbon atoms per mol of hydroxyl polyester and hydroxyl poly(alkylene oxide); said mixture having an average molecular weight from about 300 to about 450; reacted with an aryl diisocyanate, the molar amount of said polyester, poly(alklene oxide) and glycol combined being substantially equivalent to the molar amount of aryl diisocyante.

2. The polyurethane of claim 1 wherein the polyester is a polyester of an aliphatic dicarboxylic acid containing 4 to 12 carbon atoms and an aliphatic glycol containing between 4 to 10 carbon atoms, the hydroxyl poly(alkylene oxide) is a hydroxyl poly(methylene oxide), the aliphatic glycol contains 2 to 10 carbon atoms.

3. The polyurethane of claim 2 wherein the polyester has a molecular weight between about 1000 and 1600, the hydroxyl poly(alkylene oxide) has a molecular weight of about 900 to 1100, the aliphatic glycol contains 4 to 6 carbon atoms in an amount of about 2.5 to 5.2 mols per mol of polyester and poly(alkylene oxide) and the average molecular weight of the mixture is about 325 to about 400.

4. The polyurethane of claim 3 wherein the polyester is a hydroxyl poly(tetramethylene adipate), the polyether is poly(tetramethylene ether) glycol, the aliphatic diol is 1,4-butanediol, the diphenyl diisocyanate is diphenyl methane-p,p'-diisocyanate and the polyurethane has a tensile strength greater than 4500 p.s.i., Shore "D" hardness of 45 to 65, a dynamic extrusion temperature $T_2$ greater than 160° C. and 300% elastic modulus of about 3000 p.s.i. and above.

5. The polyurethane of claim 4 wherein about 80 parts of polyester and about 20 parts of polyether glycol are present in the mixture with the 1,4-butanediol.

References Cited

UNITED STATES PATENTS

| 2,741,800 | 4/1956 | Brockway | 260—75 |
| 2,871,218 | 1/1959 | Schollenberger | 260—858 |
| 2,998,403 | 8/1961 | Muller et al. | 260—858 |
| 3,015,650 | 1/1962 | Schollenberger | 260—858 |

FOREIGN PATENTS

| 583,363 | 9/1959 | Canada. |
| 1,359,969 | 3/1964 | France. |

MURRAY TILLMAN, Primary Examiner

PAUL LIEBERMAN, Assistant Examiner

U.S. Cl. X.R.

260—75, 77.5

PO-1050
(5/69)

UNITED STATES PATENT OFFICE
CERTIFICATE OF CORRECTION

Patent No. 3,493,634          Dated February 3, 1970

Inventor(s) Edmond G. Kolycheck

It is certified that error appears in the above-identified patent and that said Letters Patent are hereby corrected as shown below:

Column 5, line 50, Claim 1, "hydroxy" should read --hydroxyl--.

Column 6, line 7, Claim 1, "poly(alkene oxide)" should read --poly(alkylene oxide)--.

SIGNED AND
SEALED

JUL 14 1970

(SEAL)
Attest:

Edward M. Fletcher, Jr.
Attesting Officer

WILLIAM E. SCHUYLER, JR.
Commissioner of Patents